(12) United States Patent
Kim et al.

(10) Patent No.: US 8,632,862 B2
(45) Date of Patent: Jan. 21, 2014

(54) VERTICAL ALIGNMENT LAYER AND LIQUID CRYSTAL DISPLAY INCLUDING THE SAME

(75) Inventors: Sung Woon Kim, Suwon-si (KR); An Na Park, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 192 days.

(21) Appl. No.: 13/182,128

(22) Filed: Jul. 13, 2011

(65) Prior Publication Data

US 2012/0194770 A1    Aug. 2, 2012

(30) Foreign Application Priority Data

Feb. 1, 2011  (KR) ........................ 10-2011-0010212

(51) Int. Cl.
*G02F 1/1337* (2006.01)
(52) U.S. Cl.
USPC ............ 428/1.2; 428/1.26; 349/130; 528/289
(58) Field of Classification Search
USPC ............ 428/1.2–1.28; 349/123–135; 528/289
See application file for complete search history.

(56) References Cited

U.S. PATENT DOCUMENTS

| 6,697,134 | B2 | 2/2004 | Watanabe |
| 2005/0099564 | A1 | 5/2005 | Wang et al. |
| 2006/0285052 | A1 | 12/2006 | Jung et al. |
| 2009/0207356 | A1 | 8/2009 | Kim et al. |
| 2010/0134707 | A1 | 6/2010 | Kim et al. |

FOREIGN PATENT DOCUMENTS

| DE | 41 39 553 | 6/1992 |
| JP | 57-058129 | 4/1982 |
| JP | 09-015552 | 1/1997 |
| JP | 11-119224 | 4/1999 |
| JP | 2000-267144 | 9/2000 |
| JP | 3107380 | 9/2000 |
| JP | 2002-214615 | 7/2002 |
| JP | 2002-214646 | 7/2002 |
| JP | 2003-005187 | 1/2003 |
| JP | 2004-286993 | 10/2004 |
| JP | 2005-140926 | 6/2005 |
| JP | 2009-093143 | 4/2009 |
| JP | 2009-103756 | 5/2009 |
| KR | 10-2003-0013150 | 2/2003 |
| KR | 10-0623273 | 9/2006 |
| KR | 10-2007-0060258 | 6/2007 |
| KR | 10-0759976 | 9/2007 |
| KR | 10-2009-0111161 | 10/2009 |
| KR | 10-2010-0084823 | 7/2010 |

OTHER PUBLICATIONS

European Search Report issued on Oct. 23, 2013 in EP Application No. 11174908.1-1903.

*Primary Examiner* — Sophie Hon
(74) *Attorney, Agent, or Firm* — H.C. Park & Associates, PLC

(57) ABSTRACT

A liquid crystal display includes: a first substrate and a second substrate facing each other; a pair of field generating electrodes disposed on the first substrate; a liquid crystal layer disposed between the first substrate and the second substrate and including liquid crystal molecules having positive dielectric anisotropy; and at least one alignment layer disposed between the first substrate and the second substrate, wherein the alignment layer includes a main chain and at least one side chain connected to the main chain, and the side chain includes a vertical functional group or a polar group.

20 Claims, 6 Drawing Sheets

VERTICAL ALIGNMENT LAYER AND LIQUID CRYSTAL DISPLAY INCLUDING THE SAME

CROSS REFERENCE TO RELATED APPLICATION

This application claims priority from and the benefit of Korean Patent Application No. 10-2011-0010212, filed on Feb. 1, 2011, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display is one type of widely-used flat panel displays, and includes a pair of field generating electrodes, two sheets of display panels and a liquid crystal layer disposed therebetween. The liquid crystal display generates an electric field in a liquid crystal layer by applying a voltage to the field generating electrodes, which determines a direction of liquid crystal molecules of the liquid crystal layer to display an image by controlling polarization of incident light.

An alignment layer for aligning the liquid crystal molecules of the liquid crystal layer is formed inside the display panel. When no voltage is applied to the field generating electrodes, the liquid crystal molecules are arranged in a predetermined direction by the alignment layer, and when the voltage is applied to the field generating electrodes, the liquid crystal molecules rotate in the direction of the electric field.

The above information disclosed in this Background section is only for enhancement of understanding of the background of the invention and therefore it may contain information that does not form any portion of the prior art.

SUMMARY OF THE INVENTION

An exemplary embodiment of the present invention discloses a liquid crystal display including a first substrate and a second substrate facing each other. A pair of field generating electrodes is disposed on the first substrate and a liquid crystal layer is disposed between the first substrate and the second substrate. The liquid crystal layer includes liquid crystal molecules having positive dielectric anisotropy. At least one alignment layer is disposed between the first substrate and the second substrate. The alignment layer includes a main chain and at least one side chain connected to the main chain. The side chain includes a vertical functional group or a polar group. The alignment layer includes at least one main chain to which a side chain including a vertical functional group is connected, and includes at least one main chain to which a side chain including a polar functional group is connected.

The vertical functional group may be originated from the compound represented with Formula 1, and the polar group may be originated from the compound represented with Formula 2:

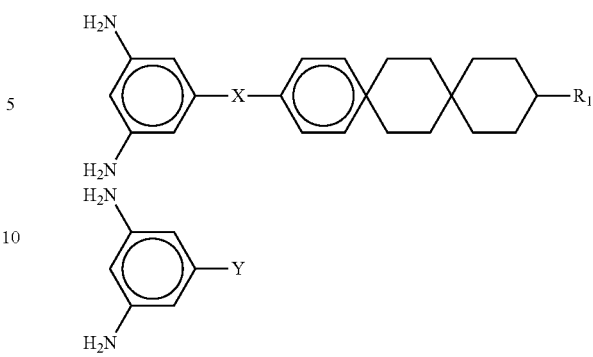

In Formula 1, X is O, COO, or N, and $R_1$ is H or a substituted or non-substituted $C_1$-$C_8$ alkyl group, and in Formula 2, Y is —COOR or —$NR_3$ (here, R is independently H, a methyl group, or an ethyl group).

The main chain may include a polyimide.

The vertical functional group may be disposed at an upper part of the alignment layer, and the polar group may be disposed at a lower part of the alignment layer.

A difference between a product of permittivity and resistivity of the liquid crystal molecules and a product of permittivity and resistivity of the alignment layer may be minimized.

The liquid crystal molecules and the alignment layer may satisfy Equation 1:

$$(\text{Log}(\in_{AL} \times \rho_{AL})) - 1 < \text{Log}(\in_{LC} \times \rho_{LC}) < (\text{Log}(\in_{AL} \times \rho_{AL})) + 1 \quad \text{[Equation 1]}$$

wherein $\in_{LC}$ is the permittivity of the liquid crystal molecules, $\rho_{LC}$ is the resistivity of the liquid crystal molecules, $\in_{AL}$ is the permittivity of the alignment layer, and $\rho_{AL}$ is the resistivity of the alignment layer.

Permittivity of the liquid crystal molecules may be about 7 to about 25, and resistivity of the liquid crystal molecules may be greater than about $1 \times 10^{-12}$ Ωcm.

Permittivity of the alignment layer may be about 3.5 to about 4.5, and resistivity of the alignment layer may be greater than about $1 \times 10^{-13}$ Ωcm.

The liquid crystal molecules may be aligned in a vertical direction with respect to the first substrate or the second substrate.

The liquid crystal molecules may be pre-tilted by about 80 to about 90 degrees in the absence of an applied electric field.

The pair of field generating electrodes may include the first pixel electrode and the second pixel electrode, and the first pixel electrode and the second pixel electrode may be disposed at the same layer and may be separated from each other.

The first pixel electrode and the second pixel electrode may receive voltages with opposite polarities with a reference voltage.

The first pixel electrode and the second pixel electrode may include a stem part and a plurality of branch electrodes extended from the stem part and a branch electrode of the first pixel electrode and a branch electrode of the second pixel electrode may be alternately disposed. A distance between a branch of the first pixel electrode and a branch of the second pixel electrode in a first region may be relatively wide, and a distance between a branch of the first pixel electrode and a branch of the second pixel electrode in a second region may be relatively narrow. The first region may be disposed in a region in which the stem part of the first pixel electrode and the second pixel electrode is not disposed from among an edge of a pixel area.

The distance between the branch of the first pixel electrode and the branch of the second pixel electrode in the first region may be constant, and the distance between the branch of the first pixel electrode and the branch of the second pixel electrode in the second region may be constant.

An exemplary embodiment of the present invention also discloses a liquid crystal display including a first substrate and a second substrate facing each other. A pair of field generating electrodes is disposed on the first substrate. A liquid crystal layer is disposed between the first substrate and the second substrate and the liquid crystal layer includes liquid crystal molecules having positive dielectric anisotropy. At least one alignment layer is disposed between the first substrate and the second substrate. A first resistivity of an upper part of the alignment layer is about ten times greater than a second resistivity of a lower part of the alignment layer. The alignment layer may include a main chain and at least one side chain connected to the main chain, and the at least one side chain may include at least one of a vertical functional group, a polar group and a combination thereof.

The upper part of the alignment layer includes about 30 to about 35 wt % of the vertical functional group and about 0 to about 70 wt % of the polar group.

The upper part of the alignment layer may not include the polar group.

The lower part of the alignment layer may include about 70 to about 80 wt % of the polar group and about 20 to about 30 wt % of the vertical functional group.

The lower part of the alignment layer may have a lesser content of the vertical functional group than the upper part of the alignment layer by about 5 to about 10 wt %.

A thickness ratio of the upper part of the alignment layer versus the lower part of the alignment layer may be about 1:9 to about 1:1.

It is to be understood that both the foregoing general description and the following detailed description are exemplary and explanatory and are intended to provide further is explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
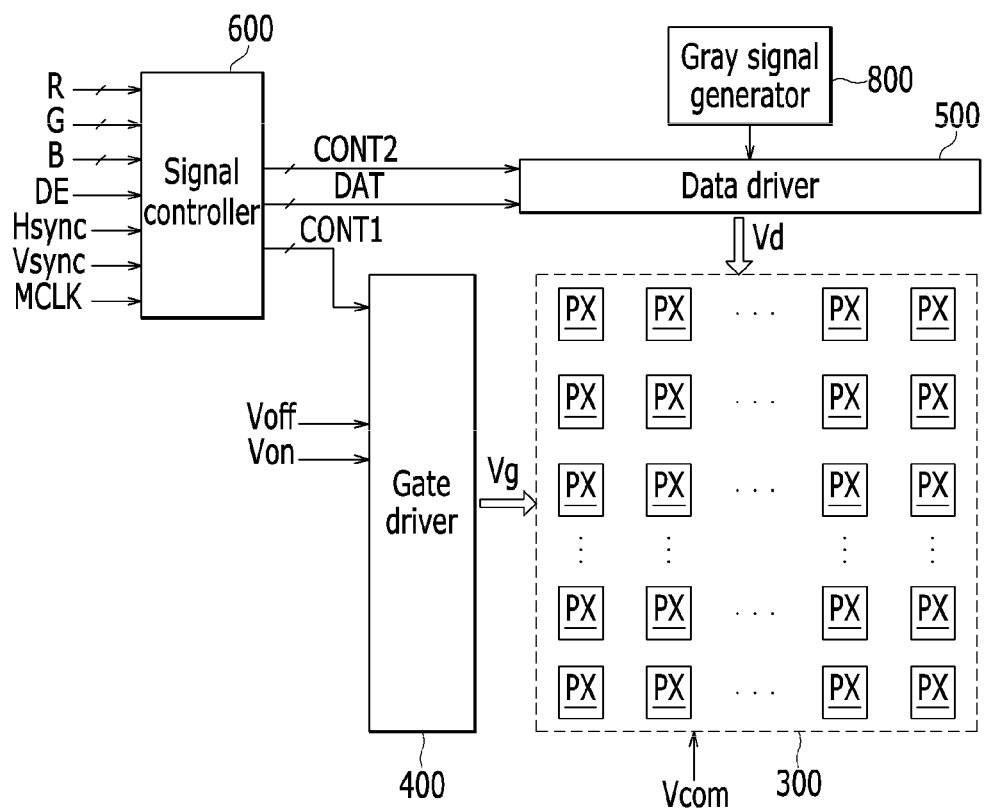
FIG. 1 shows a block diagram of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In addition, the detailed description of widely known technologies will be omitted.

In the drawings, the thickness of layers, films, panels, regions, etc., may be exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present. On the contrary, it will be understood that an element such as a layer, film, region, or substrate is referred to as being "beneath" another element, it may be directly beneath the other element or intervening elements may also be present. Meanwhile, it will be understood that when an element is referred to as being "just beneath" another element, no intervening element is present.

In the present specification, if there is no particular mention to the contrary, "substituted" refers to one substituted with at least a substituent selected from the group consisting of a halogen, a $C_1$-$C_{12}$ haloalkyl, a $C_1$-$C_{12}$ alkyl, a $C_1$-$C_{12}$ alkoxy, a $C_6$-$C_{12}$ aryl, or a $C_6$-$C_{12}$ aryloxy.

Figure 3:
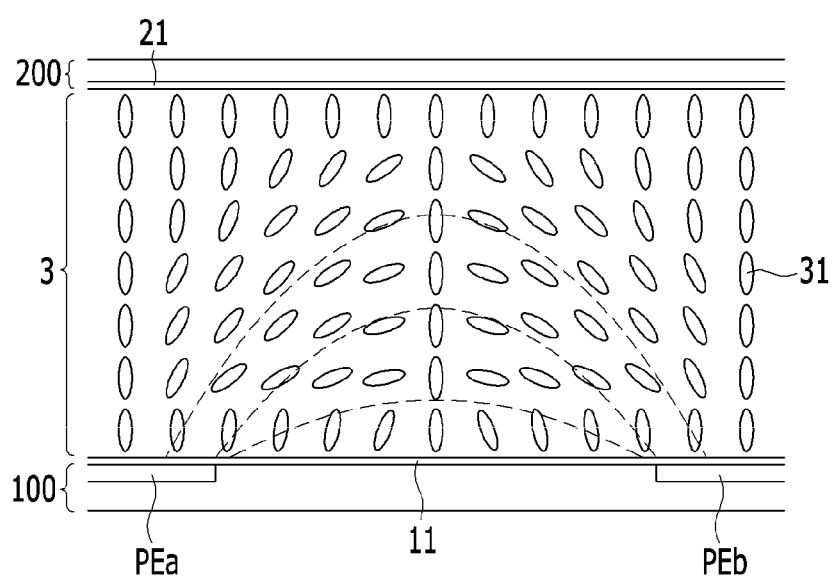
FIG. 3 shows a cross-sectional view of a liquid crystal display according to an exemplary embodiment of the present invention.
Figure 4:
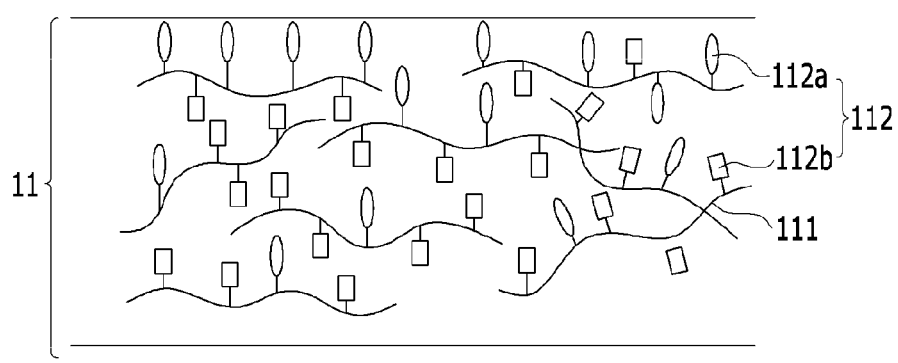
FIG. 4 shows a cross-sectional view of an alignment layer of a liquid crystal display according to an exemplary embodiment of the present invention.

A liquid crystal display according to an exemplary embodiment of the present invention will now be described with reference to FIG. 1, FIG. 2, FIG. 3 and FIG. 4. FIG. 1 shows a block diagram of a liquid crystal display according to an exemplary embodiment of the present invention, FIG. 2 shows an equivalent circuit diagram of a pixel in a liquid crystal display according to an exemplary embodiment of the present invention, FIG. 3 shows a cross-sectional view of a liquid crystal display according to an exemplary embodiment of the present invention, and FIG. 4 shows a cross-sectional view of an alignment layer of a liquid crystal display according to an exemplary embodiment of the present invention.

Referring to FIG. 1, the liquid crystal display includes a liquid crystal panel assembly 300, a gate driver 400, a data driver 500, a gray voltage generator 800, and a signal controller 600.

The liquid crystal panel assembly 300 includes a plurality of signal lines (not shown) and a plurality of pixels PX connected thereto and arranged generally in a matrix form.

Figure 2:
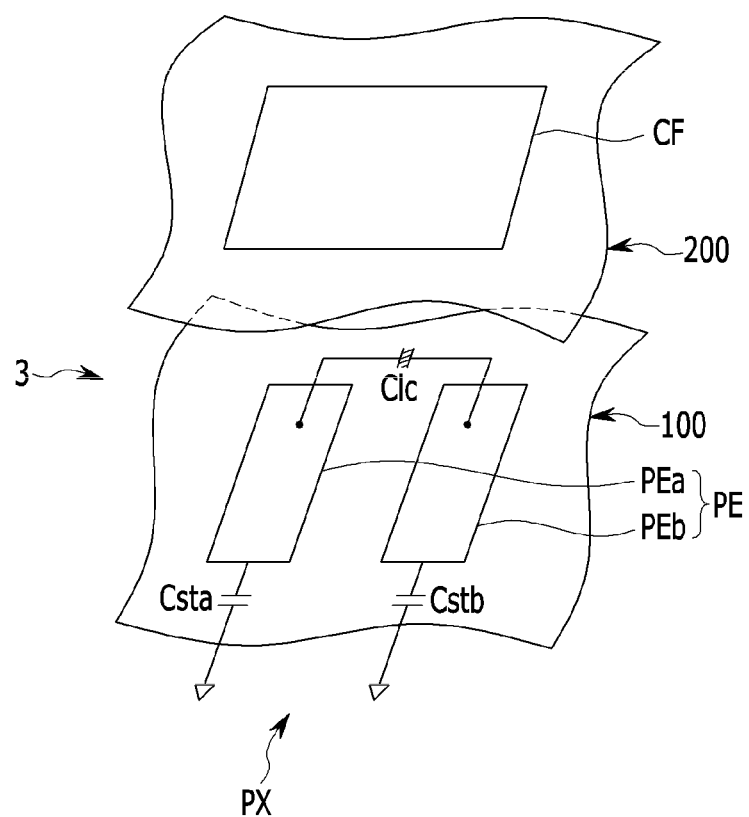
FIG. 2 shows an equivalent circuit diagram of a pixel in a liquid crystal display according to an exemplary embodiment of the present invention.

Referring to FIG. 2, the liquid crystal panel assembly 300 includes a first display panel 100 and a second display panel 200 facing each other, and a liquid crystal layer 3 disposed therebetween.

The signal lines include a plurality of gate lines for transmitting a gate signal (also called a scanning signal) and a plurality of data lines for transmitting a data voltage. The gate lines may be disposed in the row direction and may be substantially in parallel with each other. The data lines may be disposed in the column direction and may be substantially in parallel with each other.

Each pixel PX includes a liquid crystal capacitor Clc having a first pixel electrode (PEa) and a second pixel electrode (PEb) of the first display panel 100 as two terminals, and the liquid crystal layer 3 between the first and second pixel electrodes (PEa, PEb) functions as a dielectric material. A pixel electrode (PE) includes the first pixel electrode (PEa) and the second pixel electrode (PEb).

The liquid crystal layer 3 may have positive dielectric anisotropy, and the long axes of the liquid crystal molecules of the liquid crystal layer 3 may be aligned to be vertical with respect to the surfaces of the first display panel 100 and the second display panel 200 while there is no electric field.

The pixel electrode (PE) and the common electrode (CE) may be disposed in the same or different layers. First and second storage capacitors (Csta, Cstb) for working for the liquid crystal capacitor Clc may be formed when an additional electrode (not shown) installed in the first display panel 100 is overlapped with the first and second pixel electrodes (PEa, PEb), and a dielectric material is disposed between the additional electrode and the first and second pixel electrodes (PEa, PEb).

In order to realize a color system, the pixel PX is controlled to uniquely represent one of the primary colors (i.e., spatial division) or the pixel PX is controlled to alternately represent the primary colors with respect to time (i.e., temporal division) so that the desired color may be recognized by a spatial and temporal sum of the primary colors. The primary colors exemplarily include red, green, and blue. FIG. 2 shows an example of spatial division, showing that each pixel PX includes a color filter (CF) for indicating one of the primary colors in a region of the second display panel 200 corresponding to the first and second pixel electrodes (PEa, PEb). Differing from FIG. 2, the color filter (CF) may be disposed above or below the first and second pixel electrodes (PEa, PEb) of the first display panel 100.

At least one polarizer (not shown) may be disposed in the liquid crystal panel assembly 300.

Referring to FIG. 3, a first voltage is applied to the first pixel electrode (PEa), and a second voltage is applied to the second pixel electrode (PEb). The first voltage and the second voltage may have different polarities from each other. In this instance, the first voltage and the second voltage correspond to luminance displayed by the pixel PX, and the first voltage and the second voltage have opposite polarities with respect to a reference voltage. That is, the first voltage may be the same magnitude above the reference voltage as the second voltage is below the reference voltage.

A difference between the first voltage and the second voltage applied to the first pixel electrode (PEa) and the second pixel electrode (PEb) may be represented as a charged voltage of the liquid crystal capacitor Clc, that is, a pixel voltage. When a potential difference occurs at the liquid crystal capacitor Clc, an electric field in parallel with surfaces of the first display panel 100 and the second display panel 200 may be generated in the liquid crystal layer 3 between the first pixel electrode (PEa) and the second pixel electrode (PEb). When the liquid crystal molecules 31 have positive dielectric anisotropy, the liquid crystal molecules 31 are declined so that the long axes may be in parallel with the direction of the electric field, and the declined state depends on the pixel voltage. The liquid crystal layer 3 is referred to as being in an electrically-induced optical compensation (EOC) mode. Also, a changing state of polarization of the light passing through the liquid crystal layer 3 may be varied according to the declined degree of the liquid crystal molecules 31. A change of polarization may be shown as a change of transmittance of light by a polarizer so the pixel PX may display predetermined luminance. In addition, an additional electrode (not shown) may be formed on the second display panel 200, and the additional electrode may appropriately control the electric field applied to the liquid crystal layer and the direction of the liquid crystal molecules.

The driving voltage may be increased, the response speed of the liquid crystal molecules may be increased, and transmittance response of the liquid crystal display may be increased by applying two voltages having different polarities with respect to the reference voltage to a single pixel PX. Further, since the polarities of the two voltages applied to the single pixel PX are opposite to each other with respect to the reference voltage, image degradation caused by flickering may be reduced in the case of column inversion or row inversion of the data driver 500 in a like manner of dot inversion.

Referring to FIG. 3, the first display panel 100 and the second display panel 200 may include at least one alignment layer 11 and 21, respectively. When no electric field is applied to the first display panel 100 and the second display panel 200, the liquid crystal molecules 31 with positive dielectric anisotropy may be pre-tilted in the substantially vertical direction with respect to the first display panel 100 and the second display panel 200 by the alignment layers 11 and 21. For example, a pre-tilt angle of the liquid crystal molecules caused by the alignment layer may be about 80 to about 95 degrees.

Referring to FIG. 4, the alignment layer 11 may be a vertical alignment layer. The alignment layer 11 includes a plurality of compounds, and a compound may include a main chain 111 and a side chain 112 attached to the main chain 111. The side chain 112 may include at least one of a vertical functional group 112a and a polar group 112b. The side chain 112 may further include functional groups such as a flexible functional group, selectively. At least one vertical functional group 112a or at least one polar group 112b may be combined with the main chain 111. When at least one vertical functional group 112a and at least one polar group 112b are combined with the main chain 111, the vertical functional group 112a and the polar group 112b may be combined with the main chain 111 in an irregular order. FIG. 4 exemplifies the alignment layer 11, the polar group 112b may be disposed in the upper part of the alignment layer 11 or may be excluded altogether, and the alignment layer contents of the polar group 112b and the vertical functional group 112a may be variable as described below.

The vertical functional group 112a may be mainly disposed at the upper part of the alignment layer 11, and the polar group 112b may be mainly disposed at the lower part of the alignment layer 11. The vertical functional group 112a may vertically align the liquid crystal molecules 31 with positive dielectric anisotropy to improve black level expression while no electric field is applied without sacrificing alignment. The polar group 112b enables charge transfer among a plurality of main chains 111 such that the alignment layer 11 may have a low resistance structure. Because of the above-structured alignment layer 11, an afterimage may be reduced when the liquid crystal display drives the liquid crystal molecules 31 with a high dielectric constant under a high voltage condition. For example, the gray value for eliminating the surface afterimage may be reduced by more than about 40 grays, and the intensity of the surface afterimage may be reduced by more than about 10 times.

On the contrary, the alignment layers according to the conventional twisted nematic (TN) mode liquid crystal display, the conventional in-plane switching (IPS) mode liquid crystal display, and the conventional fringe field switching (FFS) mode liquid crystal display do not include a vertical functional group, and horizontally align the liquid crystal molecules with positive dielectric anisotropy, so that it is difficult to use an alignment layer for those conventional liquid crystal displays as an alignment layer in the liquid crystal display according to exemplary embodiments of the present invention. Also, the alignment layer in the conventional vertically aligned (VA) mode liquid crystal display vertically aligns the liquid crystal molecules with negative dielectric anisotropy so it is difficult to use such alignment layers for the liquid crystal display according to exemplary embodiments of the present invention.

Resistivity at the upper part of the alignment layer 11 may be greater than resistivity at the lower part of the alignment layer 11 by more than about 10 times, and in this case, charge transfer may be allowable at the lower part of the alignment layer 11 and the alignment layer 11 may have a low resistance structure. Here, a thickness ratio of the upper part of the alignment layer 11 to the lower part of the alignment layer may be about 1:9 to 1:1.

The upper part of the alignment layer 11 may include about 30 to about 35 wt % of the vertical functional group 112a, and in this case, vertical alignment of the liquid crystal molecules 31 may be improved. Also, the upper part of the alignment layer 11 may include about 0 to about 70 wt % of the polar group 112b. Further, the polar group 112b may not be included in the upper part of the alignment layer 11, and in this case, processability and reliability of the alignment layer 11 may be improved.

The lower part of the alignment layer 11 may include about 70 to about 80 wt % of the polar group 112b, and in this case, the low resistance structure of the alignment layer 11 may be improved. Further, the lower part of the alignment layer 11 may include about 20 to about 30 wt % of the vertical functional group 112a. In addition, the amount of the vertical functional group 112a included in the lower part of the alignment layer 11 may be less than the vertical functional group 112a included in the upper part of the alignment layer 11 by about 5 to about 10 wt %, and in this case, processability and reliability of the alignment layer 11 may be improved.

The alignment layers 11 and 21 include a polyimide which may be formed by a dianhydride based compound and a diamine based compound.

In further detail, a composition for forming the alignment layers 11 and 21 may include at least one kind of a dianhydride based compound, at least one kind of a diamine based compound, and at least one kind of organic solvent. Further, the composition may selectively include an additive such as a cross-linker.

The dianhydride based compound and the diamine based compound may be formed by the molar ratio of about 1:1. The composition for the alignment layer may be coated on the display panels 100 and 200 when the liquid crystal display is manufactured, and the coating method may include Inkjet printing, deposition, slit coating, and spin coating.

At least one kind of the conventional dianhydride based compound may be used for the dianhydride based compound. For example, the dianhydride based compound may be pyromellitic dianhydride (PMDA), 3,3',4,4'-oxydiphtalic dianhydride (ODPA), 3,3',4,4'-benzophenone tetracarboxylic dianhydride (BTDA), 4,4'-diphtalic (hexafluoroisopropylidene) anhydride (6FDA), benzoquinonetetracarboxylic dianhydride, and ethylenetetracarboxylic dianhydride.

The diamine based compound may include a vertical diamine based compound including the vertical functional group 112a and a polar diamine based compound including the polar functional group 112b. That is, the vertical diamine based compound includes a diamine group and a vertical functional group connected to the diamine group, and the polar diamine based compound includes a diamine group and a polar group connected to the diamine group.

For example, the vertical diamine based compound may include at least one of the compound represented by Formula 1 and the compound represented by Formula 2.

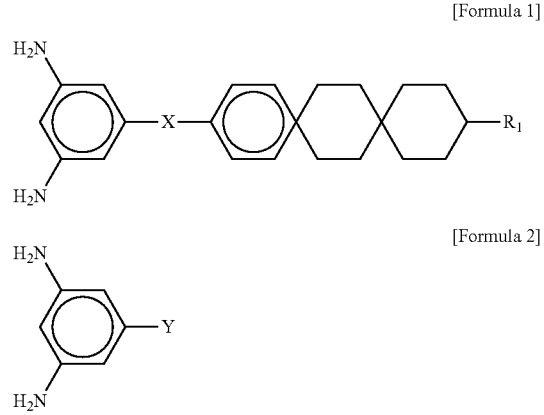

Regarding Formula 1, X is O, COO, or N, and $R_1$ is H or a substituted or non-substituted $C_1$-$C_8$ alkyl group, and regarding Formula 2, Y is —COOR or —$NR_3$ (here, R is independently H, a methyl group, or an ethyl group).

The compound shown by Formula 1 is a vertical diamine based compound including the vertical functional group 112a, and the compound shown by Formula 2 is a polar diamine based compound including the polar group 112b. The main chain 111 may be a polyimide.

The diamine based compound may include at least one kind of normal diamine based compound including no side chain. That is, the normal diamine based compound includes a diamine group without a side chain. For example, the kinds of diamine groups without a side chain may be shown by the compounds of Formulae 3 to 11.

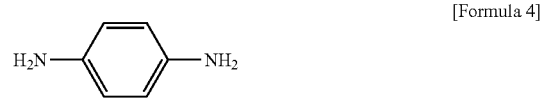

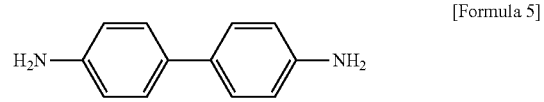

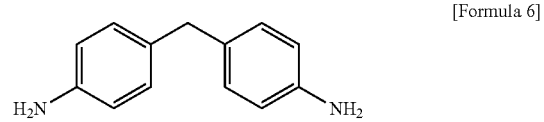

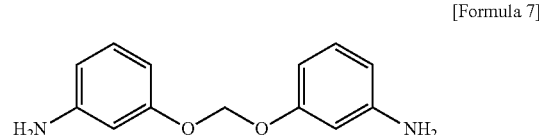

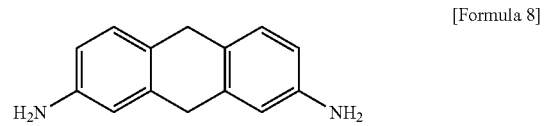

-continued

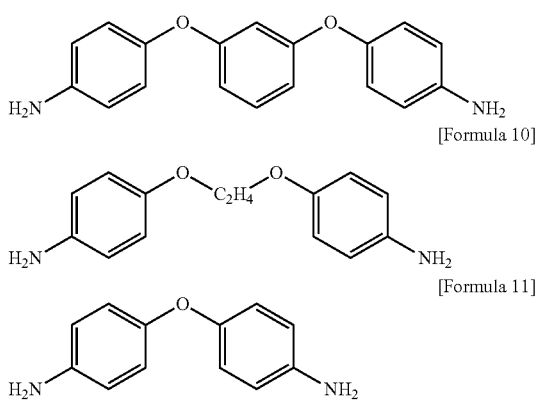

[Formula 9]

[Formula 10]

[Formula 11]

About 30 wt % to about 35 wt % of the vertical diamine based compound with reference to the solid content may be used at the upper part of the alignment layer 11. When the vertical diamine based compound is used with the range of about 30 wt % to about 35 wt %, the vertical alignment of the liquid crystal molecule 31 may be improved. Also, about 65 wt % to about 70 wt % of the sum of the polar diamine based compound and the normal diamine based compound with reference to the solid content may be used at the upper part of the alignment layer 11, and about 0 to about 70 wt % of the respective polar diamine based compound and the normal diamine based compound may be used with reference to the solid content. For example, about 30 wt % of the vertical diamine based compound, about 0 wt % of the polar diamine based compound, and about 70 wt % of the normal diamine based compound with reference to the solid content may be used at the upper part of the alignment layer 11.

About 70 wt % to about 80 wt % of the polar diamine based compound with reference to the solid content may be used at the lower part of the alignment layer 11. When about 70 wt % to about 80 wt % of the polar diamine based compound is used, resistance of the alignment layer 11 may be reduced. Also, about 20 wt % to about 30 wt % of the vertical diamine based compound with reference to the solid content may be used at the lower part of the alignment layer 11. Further, the vertical diamine based compound at the lower part of the alignment layer 11 may be about 5 wt % to about 10 wt % with reference to the solid content less than the vertical diamine based compound at the upper part of the alignment layer 11. Also, about 0 to about 10 wt % with reference to the solid content of the normal diamine based compound may be used at the lower part of the alignment layer 11.

At least one kind of general organic solvent may be used, and is not limited. At least one kind of general additive may be used, and is not limited.

When a characteristic difference between the liquid crystal molecules 31 and the alignment layer 11 is minimized, alignment stability of the liquid crystal molecules may be increased and the afterimage may be reduced.

For example, a difference between a product of permittivity and resistivity of the liquid crystal molecules 31 and a product of permittivity and resistivity of the alignment layer 11 may be minimized.

In further detail, a relationship between the permittivity ($\epsilon_{LC}$) and the resistivity ($\rho_{LC}$) of the liquid crystal molecules 31 and the permittivity ($\epsilon_{AL}$) and the resistivity ($\rho_{AL}$) of the alignment layers 11 and 21 may be represented as Equation 1.

$$(Log(\epsilon_{AL} \times \rho_{AL})) - 1 < Log(\epsilon_{LC} \times \rho_{LC}) < (Log(\epsilon_{AL} \times \rho_{AL})) + 1 \quad [\text{Equation 1}]$$

Also, the permittivity ($\epsilon_{LC}$) of the liquid crystal molecules 31 may be about 7-25, and the resistivity ($\rho_{LC}$) of the liquid crystal molecules 31 may be greater than about $1 \times 10^{-12}$ Ωcm. The permittivity ($\epsilon_{AL}$) of the alignment layers 11 and 21 may be about 3.5 to about 4.5, and the resistivity ($\rho_{AL}$) of the alignment layers 11 and 21 may be greater than about $1 \times 10^{-13}$ Ωcm. Also, the resistivity ($\rho_{AL}$) of the alignment layers 11 and 21 may be less than about $5 \times 10^{-11}$ Ωcm.

A liquid crystal display according to an exemplary embodiment of the present invention will now be described with reference to FIG. 5 and FIG. 6.

Figure 5:
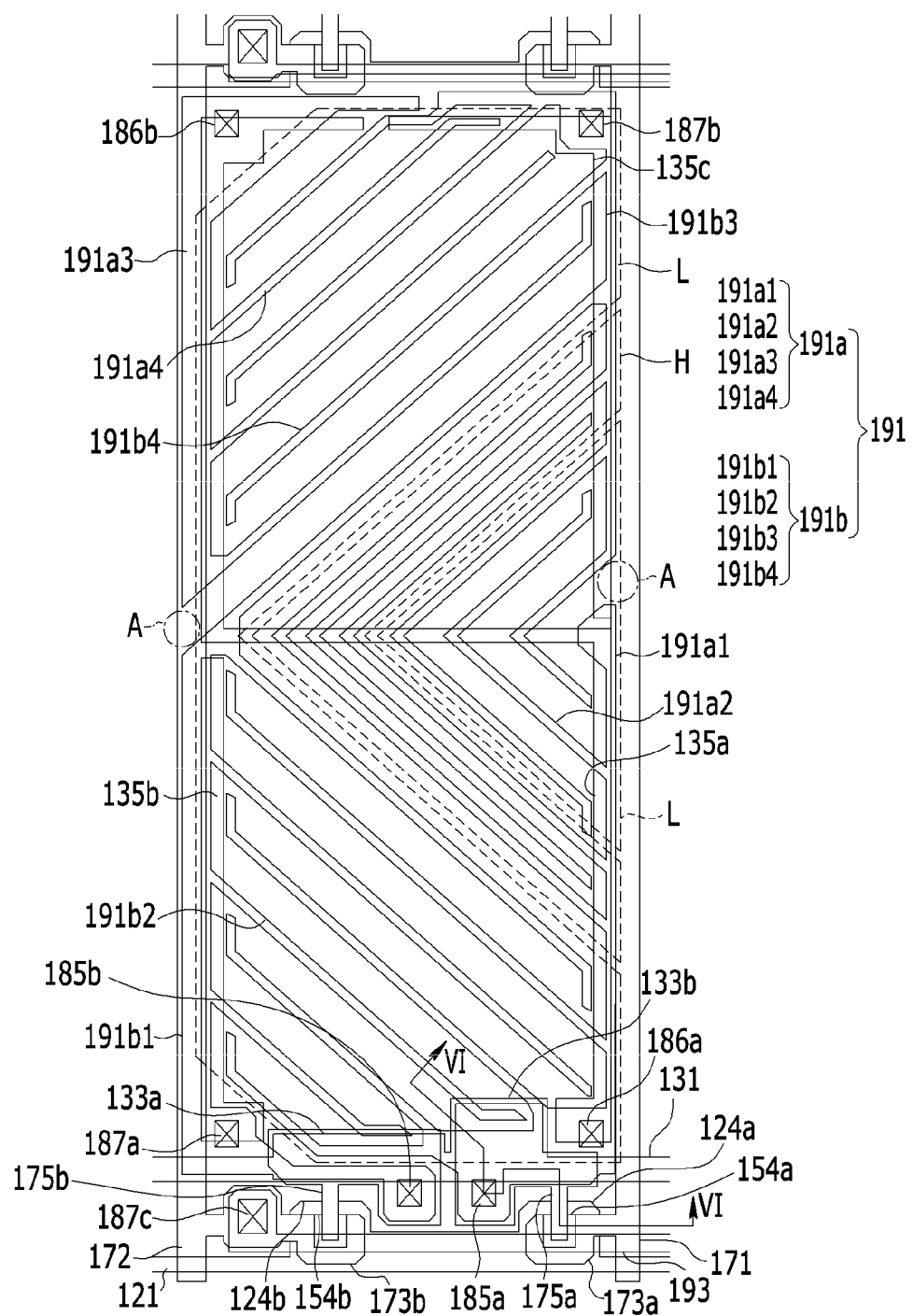
FIG. 5 shows a layout view of a liquid crystal display according to an exemplary embodiment of the present invention.
Figure 6:
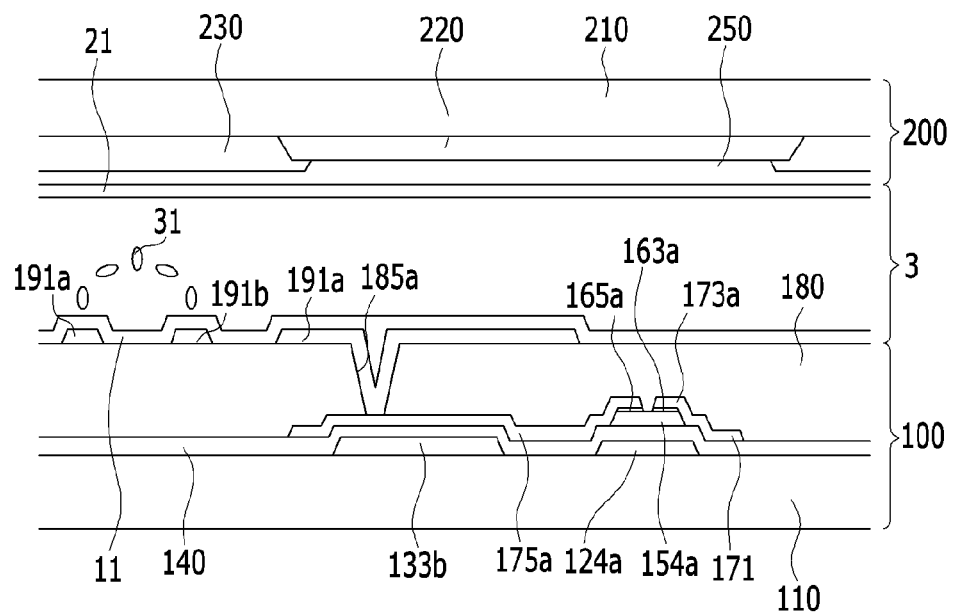
FIG. 6 shows a cross-sectional view of a liquid crystal display shown in FIG. 5 with respect to line VI-VI.

FIG. 5 shows a layout view of a liquid crystal display according to an exemplary embodiment of the present invention, and FIG. 6 shows a cross-sectional view of a liquid crystal display shown in FIG. 5 with respect to line VI-VI.

Referring to FIG. 5 and FIG. 6, the liquid crystal display includes a lower panel 100 and an upper panel 200 facing each other, and a liquid crystal layer 3 disposed between the display panels 100 and 200.

The lower panel 100 will now be described.

A plurality of gate conductors including a plurality of gate lines 121, a plurality of storage electrode lines 131, and first, second and third connecting conductors 135a, 135b, and 135c are formed on the insulation substrate 110.

The gate line 121 transmits a gate signal and is disposed in the horizontal direction, and includes a plurality of pairs of a first gate electrode 124a and a second gate electrode 124b that are protruded upwards.

The storage electrode line 131 receives a predetermined voltage, and is disposed in the horizontal direction. The storage electrode line 131 is disposed between the two neighboring gate lines 121 and is disposed nearer the gate line 121 that is disposed lower than the other. The storage electrode line 131 includes a plurality of pairs of a first storage electrode 133a and a second storage electrode 133b that are protruded upwards. The connecting conductors 135a, 135b, and 135c are disposed on an edge and a center of the pixel area.

The gate conductor may have a single-layer or multilayer structure.

A gate insulating layer 140 including a material such as silicon nitride (SiNx) or silicon oxide (SiOx) is formed on the gate conductor.

A plurality of pairs of a first semiconductor 154a and a second semiconductor 154b including a material such as hydrogenated amorphous silicon or polysilicon are formed on the gate insulating layer 140. The first semiconductor 154a and the second semiconductor 154b are disposed on the first gate electrode 124a and the second gate electrode 124b, respectively.

A pair of ohmic contacts 163a and 165a are formed on the first semiconductor 154a, and a pair of ohmic contacts (not shown) are formed on the second semiconductor 154b. The ohmic contacts 163a and 165a may include a material such as n+hydrogenated amorphous silicon doped with an n-type impurity at a high concentration such as phosphorous, or a material such as a silicide.

A data conductor including a data line 171, a first voltage transmitting line 172, and a plurality of pairs of a first drain electrode 175a and a second drain electrode 175b is formed on the ohmic contacts 163a and 165a and the gate insulating layer 140.

The data line 171 transmits a data signal, and is disposed in the vertical direction to cross the gate line 121 and the storage electrode line 131. The data line 171 includes a first source electrode 173a that is a bend having a U shape opening toward the first gate electrode 124a.

The first voltage transmitting line 172 transmits a predetermined first voltage, and disposed in parallel with the data line 171 to cross the gate line 121 and the storage electrode line 131. The first voltage transmitting line 172 includes a second source electrode 173b that is a bend having a U shape opening toward the second gate electrode 124b. The first voltage transmitted by the first voltage transmitting line 172 may have a predetermined size, and may have an opposite polarity to the data signal transmitted by the data line 171.

The first drain electrode 175a and the second drain electrode 175b each include a first end proximate the respective first source electrode 173a and second source electrode 173b, that has a rod shape and a second end that is wide and distal the respective first source electrode 173a and second source electrode 173b. The first end of the first drain electrode 175a faces the first source electrode 173a with respect to the first gate electrode 124a, and the first end is partially surrounded by the U-shaped bend of the first source electrode 173a. The second end of the first drain electrode 175a is electrically connected to the first pixel electrode 191a through the first contact hole 185a. The first end of the second drain electrode 175b faces the second source electrode 173b with respect to the second gate electrode 124b, and the first end of the second drain electrode 175b is partially surrounded by the U-shaped bend of the second source electrode 173b. The second end is electrically connected to the second pixel electrode 191b through the second contact hole 185b.

The first gate electrode 124a, the first source electrode 173a, and the first drain electrode 175a form a first thin film transistor (TFT) together with the first semiconductor 154a, and a channel of the first thin film transistor is formed in the first semiconductor 154a between the first source electrode 173a and the first drain electrode 175a.

The second gate electrode 124b, the second source electrode 173b, and the second drain electrode 175b form a second thin film transistor together with the second semiconductor 154b, and a channel of the second thin film transistor is formed in the second semiconductor 154b between the second source electrode 173b and the second drain electrode 175b.

The data conductors 171, 172, 175a, and 175b may have a single-layer or multilayer structure.

The ohmic contacts 163a and 165a are disposed between the semiconductors 154a and 154b and the respective data conductors 171, 172, 175a, and 175b, and may reduce contact resistance therebetween. The semiconductors 154a and 154b include portions that are not covered by the data conductors 171, 172, 175a, and 175b and portions between the source electrodes 173a and 173b and the drain electrodes 175a and 175b.

A passivation layer 180 may include a material such as an inorganic insulator or an organic insulator, and is formed on the data conductors 171, 172, 175a, 175b and the exposed portions of the semiconductors 154a and 154b.

Contact holes 185a and 185b for partially revealing the second ends of the first drain electrode 175a and the second drain electrode 175b, respectively, are formed in the passivation layer 180. A plurality of contact holes 186a, 186b, 187a, and 187b for partially revealing the first, second and third connecting conductors 135a, 135b, and 135c are formed in the passivation layer 180 and the gate insulating layer 140.

A plurality of pixel electrodes 191 including a plurality of pairs of first and second pixel electrodes 191a and 191b including a transparent conductive material such as indium tin oxide (ITO) or indium zinc oxide (IZO) or a reflective metal such as aluminum, silver, chromium, or an alloy thereof are formed on the passivation layer 180.

As shown in FIG. 5, the pixel electrode 191 is quadrangular, and the first pixel electrode 191a and the second pixel electrode 191b are combined. The first pixel electrode 191a and the second pixel electrode 191b form up and down symmetry with respect to an imaginary transverse central line, and are respectively divided into two; forming upper and lower sub-regions.

The first pixel electrode 191a includes a lower stem 191a1 and an upper stem 191a3, and a plurality of first branches 191a2 and a plurality of second branches 191a4 extending from the lower stem 191a1 and the upper stem 191a3, respectively. The second pixel electrode 191b includes a lower stem 191b1 and an upper stem 191b3, and a plurality of third branches 191b2 and a plurality of fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, respectively. The lower stem 191b1 and the upper stem 191b3 of the second pixel electrode 191b are disposed on the left side and the right side of one pixel electrode, respectively.

By this arrangement, the magnitude of the parasitic capacitance formed by overlapping the data line and the first voltage transmitting line that are disposed on the left side and the right side of one pixel electrode with the pixel electrode may be formed to be symmetrical on the left side and the right side of the pixel electrode such that the magnitudes of the parasitic capacitances between the first pixel electrode 191a and the second pixel electrode 191b, and two left and right signal lines, may be the same, and crosstalk deterioration generated by the deviation of the right and left parasitic capacitances may be prevented.

The angle of the plurality of branches 191a2, 191a4, 191b2, and 191b4 of the first pixel electrode 191a and the second pixel electrode 191b with respect to the transverse center line may be about 45 degrees.

The branches of the first pixel electrode 191a and the second pixel electrode 191b engage with each other with a predetermined interval therebetween and are alternately disposed to form a pectinated pattern. The gap between the branches 191a2, 191a4, 191b2, and 191b4 of the first pixel electrode 191a and the second pixel electrode 191b may be within about 30 μm.

The branches of the first pixel electrode 191a and the second pixel electrode 191b engage with each other and are alternately disposed, thereby forming the pectinated pattern. A low gray region L in which the interval between the neighboring branches is wide and a high gray region H in which the interval between the neighboring branches is narrow exist, and the high gray region H is disposed at the center of the pixel area and is substantially enclosed by the low gray region L. It is possible to vary the inclination angle of the liquid crystal molecules 31 of the liquid crystal layer 3 and display different luminance with respect to one image information set by varying the interval between the first pixel electrode 191a and the second pixel electrode 191b in one pixel. Further, it is possible to maximize a similarity between an image viewed from the side and an image viewed from the front by properly adjusting the interval between the branches of the first pixel electrode 191a and the second pixel electrode 191b. Therefore, it is possible to improve side visibility and enhance transmittance.

In the liquid crystal display according to the present exemplary embodiment, a ratio of the low gray region L and the high gray region H may be in a range of about 4:1 to about 30:1. Also, the interval between the branches of the first pixel electrode 191a and the second pixel electrode 191b may be about 10 μm to about 20 μm in the low gray region L, and the interval between the branches of the first pixel electrode 191a and the second pixel electrode 191b may be about 3 μm to about 7 μm in the high gray region H.

The low gray region L is disposed to include a portion A that is not enclosed by the stems 191a1, 191a3, 191b1, and 191b3 of the first pixel electrode 191a and the second pixel electrode 191b at the pixel outer portion of the liquid crystal display according to the present exemplary embodiment, such that this region where the magnitude of the horizontal electric field between the first pixel electrode 191a and the second pixel electrode 191b is relatively weak is disposed in the low gray region L. Accordingly, deterioration in display quality that may be generated by the asymmetry of the direction of the horizontal electric field between the first pixel electrode 191a and the second pixel electrode 191b such as texture may be reduced.

However, the shape of the first pixel electrode 191a and the second pixel electrode 191b in one pixel of the liquid crystal display according to an exemplary embodiment of the present invention is not limited thereto, and all shapes of which at least portions of the first pixel electrode 191a and the second pixel electrode 191b are formed the same and are alternately disposed may be applied.

The first pixel electrode 191a is physically and electrically connected to the first drain electrode 175a through the contact hole 185a, and receives a data voltage from the first drain electrode 175a. Also, the second pixel electrode 191b is physically and electrically connected to the second drain electrode 175b through the contact hole 185b, and receives a first voltage from the second drain electrode 175b through the first voltage transmitting line 172. The first sub-pixel electrode 191a and the second sub-pixel electrode 191b form the liquid crystal capacitor Clc along with the liquid crystal layer 3 interposed therebetween to maintain the applied voltage after the first thin film transistor and the second thin film transistor are turned off.

The wide ends of the first drain electrode 175a and the second drain electrode 175b connected to the first sub-pixel electrode 191a and the second sub-pixel electrode 191b, respectively, overlap the storage electrodes 133a and 133b, respectively, via the gate insulating layer 140 thereby forming a first storage capacitor Csta and a second storage capacitor Cstb, respectively, and the storage capacitors Csta and Cstb reinforce the voltage maintaining capacity of the liquid crystal capacitor Clc.

The first pixel electrode lower stem 191a1 of the first pixel electrode 191a is connected to the first connecting conductor 135a through the contact hole 186a, and the first pixel electrode upper stem 191a3 of the first pixel electrode 191a is connected to the first connecting conductor 135a through the contact hole 186b, thereby receiving the voltage from the first drain electrode 175a.

The second pixel electrode lower stem 191b1 of the second pixel electrode 191b is connected to the second connecting conductor 135b through the contact hole 187a, and the second pixel electrode upper stem 191b3 of the second pixel electrode 191b is connected to the third connecting conductor 135c through the contact hole 187b, thereby receiving the first voltage from the second drain electrode 175b.

A lower alignment layer 11 may be coated on an inner surface of the display panel 100, and the lower alignment layer 11 may be a vertical alignment layer. Although not shown, a polymer layer may be formed on the lower alignment layer 11, and the polymer layer may include a polymer branch that is formed according to an initial alignment direction of the liquid crystal molecules 31. The polymer layer may be formed by exposing and polymerizing a prepolymer such as a monomer, that is hardened by polymerization with light like ultraviolet rays and the alignment force of the liquid crystal molecules may be controlled according to the polymer branch.

The upper panel 200 will now be described.

A light blocking member 220 is formed on an insulation substrate 210 made of transparent glass or plastic. The light blocking member 220 prevents light leakage between the pixel electrodes 191, and defines an opening region that faces the pixel electrode 191.

A plurality of color filters 230 are formed on the substrate 210 and the light blocking member 220. The color filters 230 mostly exist within the area surrounded by the light blocking member 220, and may longitudinally extend along the columns of the pixel electrodes 191 in the longitudinal direction. The respective color filters 230 may display one of the three primary colors including red, green, and blue. The primary colors may further include a transparent color.

An overcoat 250 is formed on the color filters 230 and the light blocking member 220. The overcoat 250 may be made of an inorganic or organic insulator, and prevents the color filters 230 from being exposed and provides a planarized surface. The overcoat 250 may be omitted.

An upper alignment layer 21 is coated on the inner surface of the display panel 200, and the upper alignment layer may be a vertical alignment layer. Although not shown, the polymer layer may also be formed on the upper alignment layer. The polymer layer may be formed by exposing a prepolymer such as a monomer, which is hardened by polymerization with light like ultraviolet rays such as a monomer, such that the alignment force of the liquid crystal molecules may be controlled. The polymer layer may include a polymer branch that is formed according to the initial alignment direction of the liquid crystal molecules.

A polarizer (not shown) may be disposed on the outer surface of the display panels 100 and 200.

The liquid crystal layer 3 that is disposed between the lower display panel 100 and the upper display panel 200 includes the liquid crystal molecules 31 that have a positive dielectric anisotropicity, and the liquid crystal molecules 31 may be aligned so that long axes thereof are perpendicular with respect to the surfaces of the two display panels 100 and 200 in a state in which there is no electric field.

When the data voltages with opposite polarities are applied to the respective first pixel electrode 191a and second pixel electrode 191b, a substantially horizontal electric field is generated on the surfaces of the display panels 100 and 200. Thus, the liquid crystal molecules 31 of the liquid crystal layer 3 that are initially aligned perpendicular to the surfaces of the display panels 100 and 200 are rearranged in response to the electric field such that the long axes thereof are declined parallel to the direction of the electric field, and the change degree of the polarization of the light incident to the liquid crystal layer 3 is different according to the declination degree of the liquid crystal molecules 31. The change of the polarization appears as a change of transmittance by the polarizer, and thereby the liquid crystal display displays images.

Furthermore, when the liquid crystal molecules 31 that are aligned perpendicular to the display panel 100 and 200 are used, the contrast ratio of the liquid crystal display may be improved and the wide viewing angle may be realized. In addition, since the liquid crystal molecules 31 that have positive dielectric anisotropicity have greater dielectric anisotropicity and lower rotation viscosity compared to the liquid crystal molecules 31 that have negative dielectric anisotropicity, it is possible to obtain a rapid response speed.

Also, in the liquid crystal display according to the present exemplary embodiment, the branches of the first pixel electrode 191a and the second pixel electrode 191b engage with each other and are alternately disposed, thereby forming a pectinated pattern. A low gray region L is formed where the interval between the neighboring branches is wide and a high gray region H is formed where the interval between the neighboring branches is narrow, and the high gray region H is disposed at the center of the pixel area and is substantially enclosed by the low gray region L. It is possible to vary the inclination angle of the liquid crystal molecules 31 of the liquid crystal layer 3 and display different luminance with respect to one image information set by varying the interval between the first pixel electrode 191a and the second pixel electrode 191b in one pixel. Further, it is possible to maximize the similarity of an image viewed from the side to an image viewed from the front by properly adjusting the interval between the branches of the first pixel electrode 191a and the second pixel electrode 191b. Therefore, it is possible to improve side visibility and enhance transmittance.

Also, since the liquid crystal display according to the present exemplary embodiment includes the low gray region L and the high gray region H where the intervals between the branches of the first pixel electrode 191a and the second pixel electrode 191b are different, it is possible to maximize the similarity between an image viewed from the side and an image viewed from the front. Therefore, it is possible to improve side visibility and enhance transmittance.

According to the present exemplary embodiment, a portion A that is not enclosed by the stems 191a1, 191a3, 191b1, and 191b3 of the first pixel electrode 191a and the second pixel electrode 191b at the pixel outer portion of the liquid crystal display where the magnitude of the horizontal electric field between the first pixel electrode 191a and the second pixel electrode 191b is relatively weak is disposed in the low gray region L. Accordingly, deterioration of display quality that may be generated by asymmetry of the direction of the horizontal electric field between the first pixel electrode 191a and the second pixel electrode 191b, such as texture, may be reduced.

Additionally, according to the exemplary embodiments, liquid crystals having positive dielectric anisotropy are vertically aligned and afterimages are reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate and a second substrate facing each other;
a pair of field generating electrodes disposed on the first substrate;
a liquid crystal layer disposed between the first substrate and the second substrate, the liquid crystal layer comprising liquid crystal molecules having positive dielectric anisotropy; and
at least one alignment layer disposed between the first substrate and the second substrate, wherein the at least one alignment layer comprises:
a main chain and at least one side chain connected to the main chain, wherein the at least one side chain comprises a vertical functional group or a polar group;
at least one main chain to which a side chain comprising a vertical functional group is connected;
at least one main chain to which a side chain comprising a polar functional group is connected; and
wherein the vertical functional group is originated from a compound represented by Formula 1:

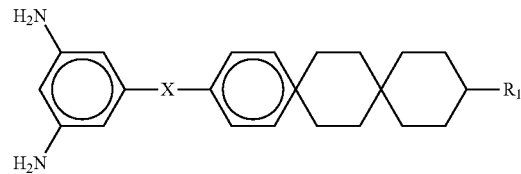

[Formula 1]

wherein X is O, COO, or N, and $R_1$ is H or a substituted or non-substituted $C_1$-$C_8$ alkyl group.

2. The liquid crystal display of claim 1, wherein the vertical functional group is originated from the compound represented by Formula 1, and the polar group is originated from a compound represented by Formula 2:

[Formula 1]

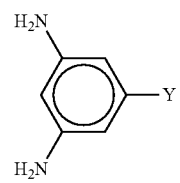

[Formula 2]

wherein, in Formula 1, X is O, COO, or N, and $R_1$ is H or a substituted or non-substituted $C_1$-$C_8$ alkyl group, and in Formula 2, Y is —COOR or —$NR_3$ (here, R is independently H, a methyl group, or an ethyl group).

3. The liquid crystal display of claim 2, wherein the main chain comprises a polyimide.

4. The liquid crystal display of claim 2, wherein the main chain to which a side chain comprising the vertical functional group is disposed at an upper part of the alignment layer, and the main chain to which a side chain comprising the polar group is disposed at a lower part of the alignment layer.

5. The liquid crystal display of claim 2, wherein a difference between a product of permittivity and resistivity of the liquid crystal molecules and a product of permittivity and resistivity of the alignment layer is minimized.

6. The liquid crystal display of claim 5, wherein the liquid crystal molecules and the alignment layer satisfy Equation 1:

$$(\text{Log}(\in_{AL} \times \rho_{AL})) - 1 < \text{Log}(\in_{LC} \times \rho_{LC}) < (\text{Log}(\in_{AL} \times \rho_{AL})) + 1 \qquad \text{[Equation 1]}$$

wherein $\in_{LC}$ is the permittivity of the liquid crystal molecules, $\rho_{LC}$ is the resistivity of the liquid crystal molecules, $\in_{AL}$ is the permittivity of the alignment layer, and $\rho_{AL}$ is the resistivity of the alignment layer.

7. The liquid crystal display of claim 6, wherein permittivity of the liquid crystal molecules is about 7 to about 25, and resistivity of the liquid crystal molecules is greater than about $1 \times 10^{-12}$ Ωcm.

8. The liquid crystal display of claim 6, wherein permittivity of the alignment layer is about 3.5 to about 4.5, and resistivity of the alignment layer is less than about $5 \times 10^{-11}$ Ωcm and greater than about $1 \times 10^{-13}$ Ωcm.

9. The liquid crystal display of claim 1, wherein the liquid crystal molecules are aligned in a vertical direction with respect to the first substrate or the second substrate.

10. The liquid crystal display of claim 9, wherein the liquid crystal molecules are pre-tilted by about 80 to about 90 degrees in the absence of an applied electric field.

11. The liquid crystal display of claim 1, wherein the pair of field generating electrodes comprises a first pixel electrode and a second pixel electrode, and the first pixel electrode and the second pixel electrode are disposed at the same layer and are separated from each other.

12. The liquid crystal display of claim 11, wherein the first pixel electrode and the second pixel electrode are configured to receive voltages with opposite polarities with a reference voltage.

13. The liquid crystal display of claim 1, wherein the first pixel electrode and the second pixel electrode each comprise a stem part and a plurality of branch electrodes extended from the stem part, wherein the branch electrodes of the first pixel electrode and the branch electrodes of the second pixel electrode are alternately disposed with each other, a distance between a first branch electrode of the first pixel electrode and a first branch electrode of the second pixel electrode in a first region is greater than a distance between a second branch electrode of the first pixel electrode and a second branch electrode of the second pixel electrode in a second region, and the first region is disposed in a region in which the stem part of the first pixel electrode and the stem part of the second pixel electrode are not disposed at an edge of a pixel area.

14. The liquid crystal display of claim 13, wherein the distance between the first branch electrode of the first pixel electrode and the first branch electrode of the second pixel electrode in the first region is constant, and the distance between the second branch electrode of the first pixel electrode and the second branch electrode of the second pixel electrode in the second region is constant.

15. The liquid crystal display of claim 13, wherein the vertical functional group is originated from the compound represented by Formula 1, and the polar group is originated from a compound represented by Formula 2:

[Formula 1]

[Formula 2]

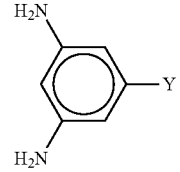

wherein, in Formula 1, X is O, COO, or N, and $R_1$ is H or a substituted or non-substituted $C_1$-$C_8$ alkyl group, and in Formula 2, Y is —COOR or —$NR_3$ (here, R is independently H, a methyl group, or an ethyl group).

16. The liquid crystal display of claim 13, wherein a difference between a product of permittivity and resistivity of the liquid crystal molecules and a product of permittivity and resistivity of the alignment layer is minimized.

17. The liquid crystal display of claim 1, wherein a difference between a product of permittivity and resistivity of the liquid crystal molecules and a product of permittivity and resistivity of the alignment layer is minimized.

18. The liquid crystal display of claim 17, wherein the liquid crystal molecules and the alignment layer satisfy Equation 1:

$$(\text{Log}(\in_{AL} \times \rho_{AL})) - 1 < \text{Log}(\in_{LC} \times \rho_{LC}) < (\text{Log}(\in_{AL} \times \rho_{AL})) + 1 \quad \text{[Equation 1]}$$

wherein $\in_{LC}$ is the permittivity of the liquid crystal molecules, $\rho_{LC}$ is the resistivity of the liquid crystal molecules, $\in_{AL}$ is the permittivity of the alignment layer, and $\rho_{AL}$ is the resistivity of the alignment layer.

19. The liquid crystal display of claim 18, wherein permittivity of the liquid crystal molecule is about 7 to about 25, and resistivity of the liquid crystal molecules is greater than about $1 \times 10^{-12}$ Ωcm.

20. The liquid crystal display of claim 18, wherein permittivity of the alignment layer is about 3.5 to about 4.5, and resistivity of the alignment layer is less than about $5 \times 10^{-11}$ Ωcm and greater than about $1 \times 10^{-13}$ Ωcm.

* * * * *